United States Patent [19]
Koizumi

[11] Patent Number: 5,663,834
[45] Date of Patent: Sep. 2, 1997

[54] EYEPIECE ZOOM LENS SYSTEM

[75] Inventor: Noboru Koizumi, Omiya, Japan

[73] Assignee: Fuji Photo Optical Co. Ltd., Omiya, Japan

[21] Appl. No.: 668,185

[22] Filed: Jun. 21, 1996

[30] Foreign Application Priority Data

Sep. 12, 1995 [JP] Japan .................. 7-260756

[51] Int. Cl.$^6$ .......... G02B 25/00; G02B 15/14; G02B 23/00; G02B 21/00
[52] U.S. Cl. .......... 359/643; 359/644; 359/645; 359/689; 359/432; 359/380; 359/418
[58] Field of Search .............. 359/643, 644, 359/645, 689, 432, 380, 418

[56] References Cited

U.S. PATENT DOCUMENTS

| | | | |
|---|---|---|---|
| 2,394,635 | 2/1946 | Reiss | 359/645 |
| 3,638,996 | 2/1972 | Klein | 359/643 |
| 4,501,477 | 2/1985 | Sunaga | 359/380 |
| 4,978,204 | 12/1990 | Ito | 359/689 |
| 5,162,945 | 11/1992 | Matsuo et al. | 359/645 |
| 5,202,795 | 4/1993 | Kashima | 359/645 |
| 5,255,121 | 10/1993 | Suzuki | 359/643 |

FOREIGN PATENT DOCUMENTS

| | | | |
|---|---|---|---|
| 1162592 | 2/1964 | Germany | 359/645 |
| 53-51757 | 5/1978 | Japan . | |
| 7-34061 | 6/1987 | Japan . | |
| 535537 | 2/1976 | U.S.S.R. | 359/645 |

Primary Examiner—Georgia Y. Epps
Assistant Examiner—Evelyn A. Lester
Attorney, Agent, or Firm—Ronald R. Snider

[57] ABSTRACT

In an eyepiece zoom lens having a lens configuration constituted by seven lenses in three groups, predetermined conditional expressions are satisfied so as to realize a zoom ratio of 3 while attaining a sufficient eye relief and ameliorating various kinds of aberration. The first lens group $G_1$ is made stationary, whereas the second lens group $G_2$ and the third lens group $G_3$ are made as movable groups which, when changing the power, respectively move in directions opposite to each other on the optical axis while holding therebetween an object image which is formed between these two lens groups. Further, the eyepiece zoom lens is configured so as to satisfy the following conditional expressions:

$5 < f_1/f_m < 7, 3.5 < f_2/f_m < 4.5, -3.7 < f_3/f_m < -3, 0.1 < S_{12}/f_m < 1.0, 6.0 < S_{23}/f_m < 8.0, \nu_1 < 35, \nu_2 < 35, \nu_3 < 50$

1 Claim, 8 Drawing Sheets

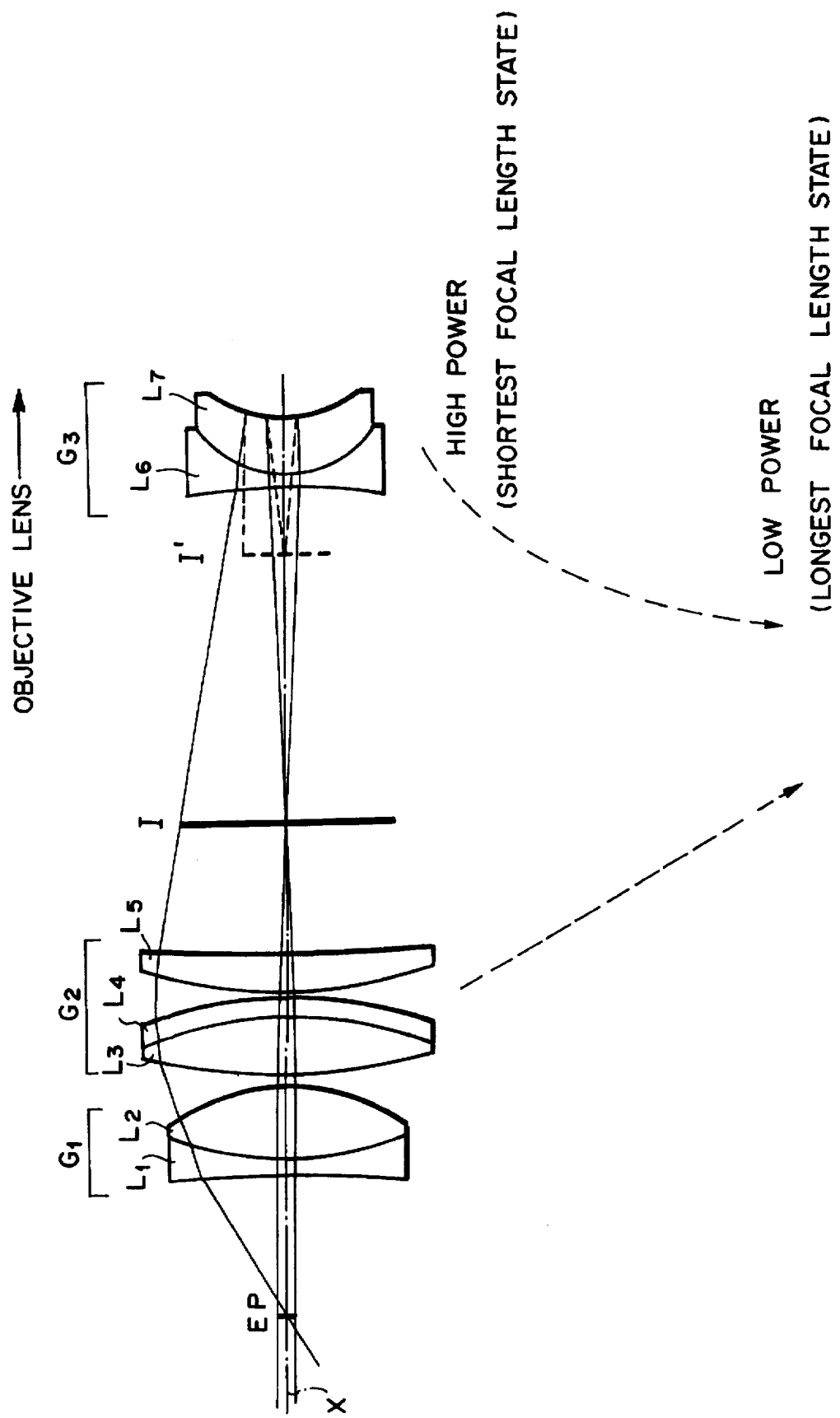

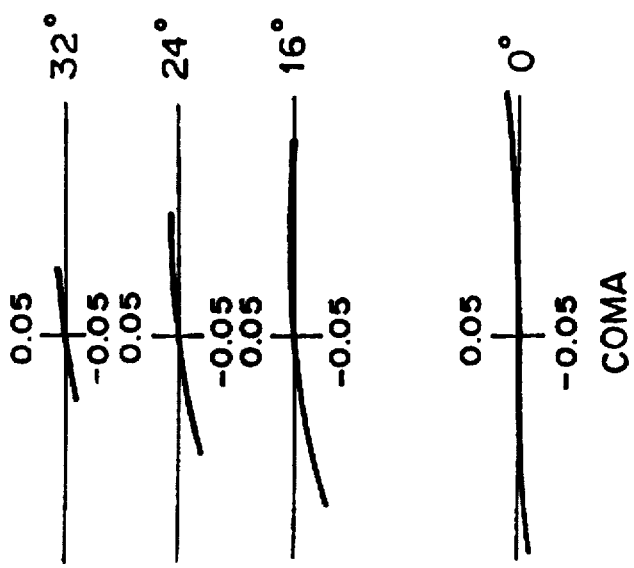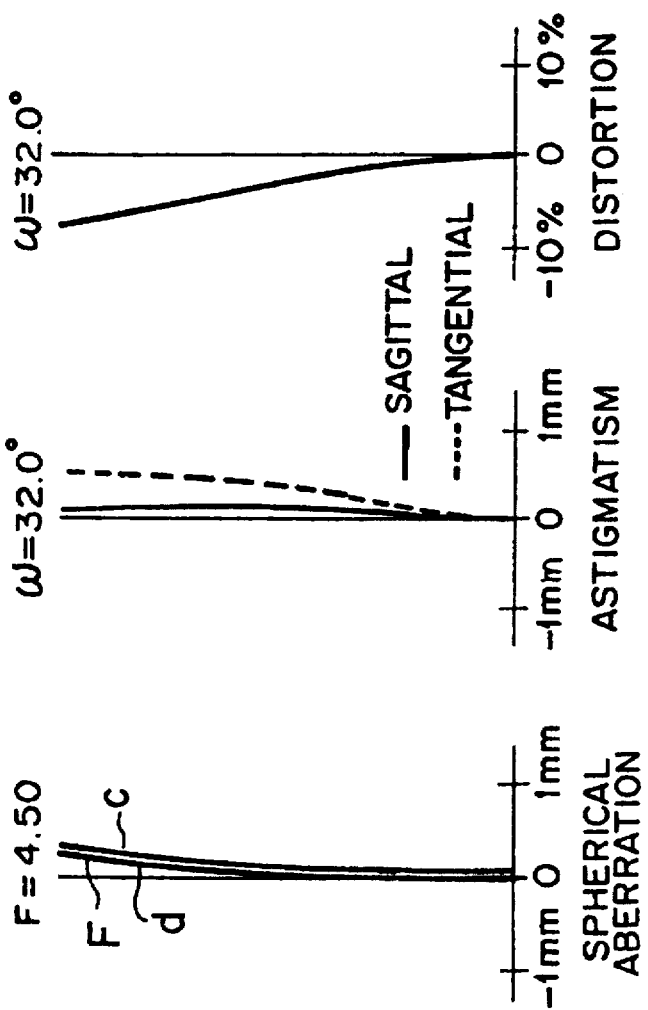
EMBODIMENT 1
SHORTEST FOCAL LENGTH STATE
FIG. 3A  SPHERICAL ABERRATION
FIG. 3B  ASTIGMATISM
FIG. 3C  DISTORTION
FIG. 3D  COMA

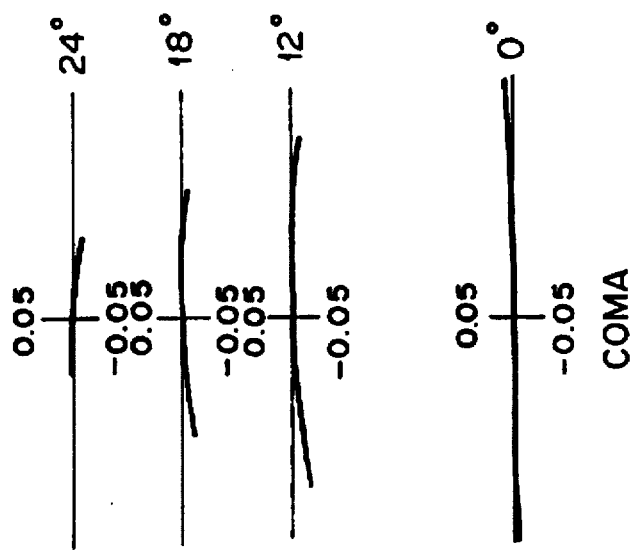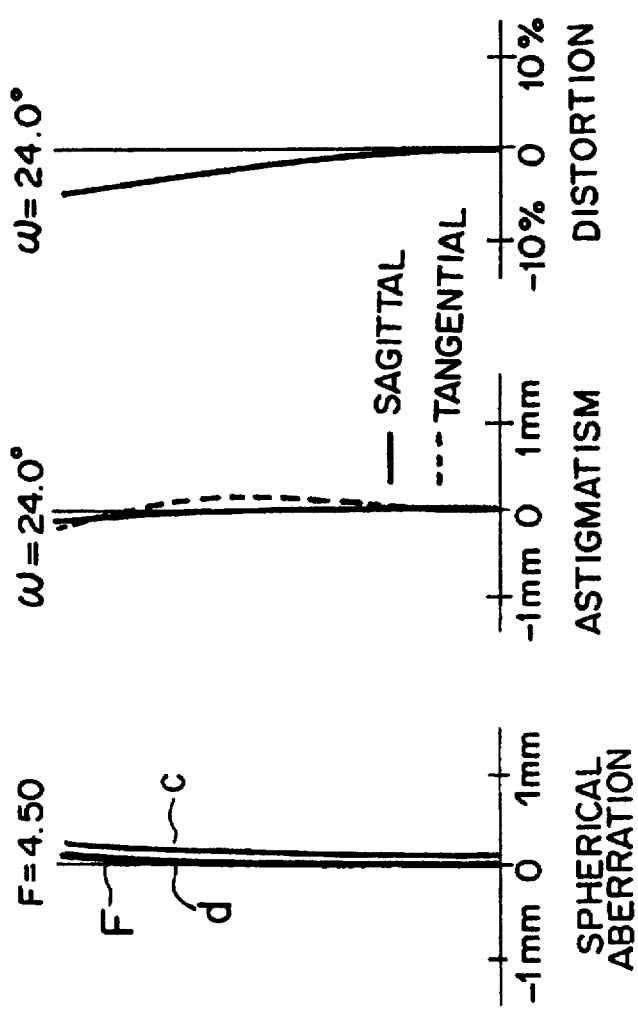

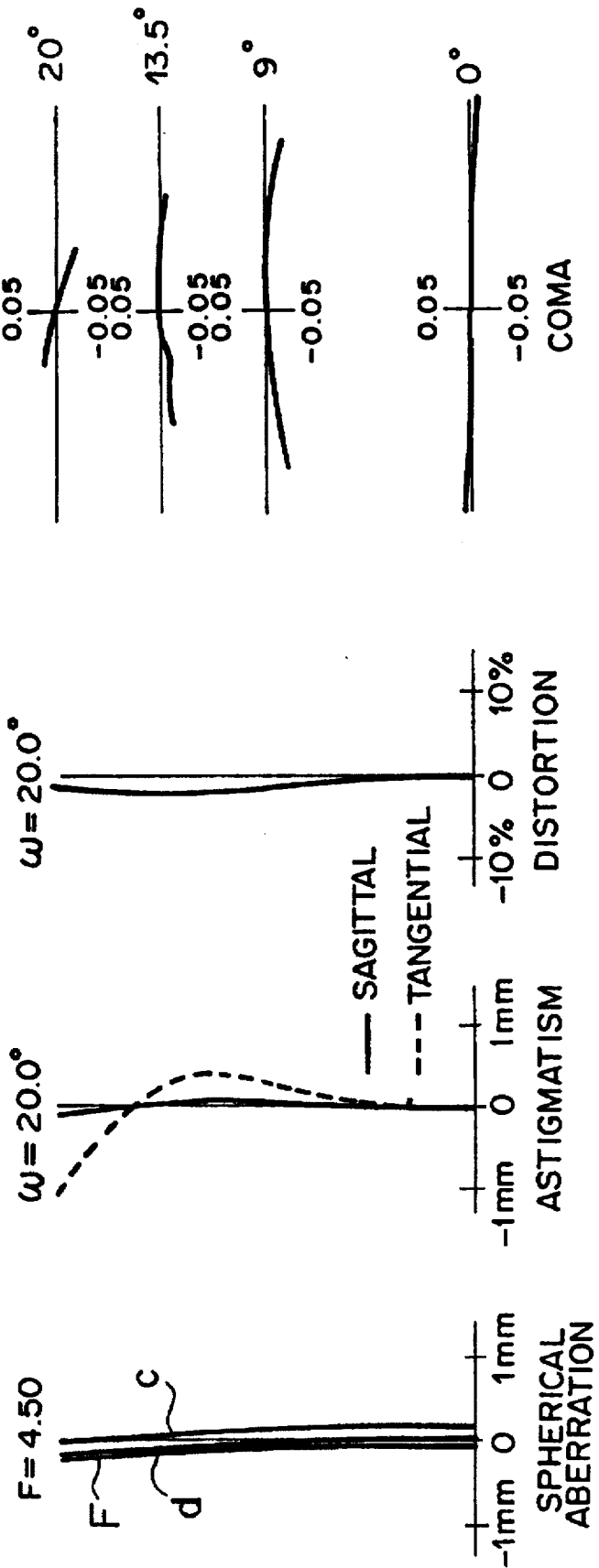

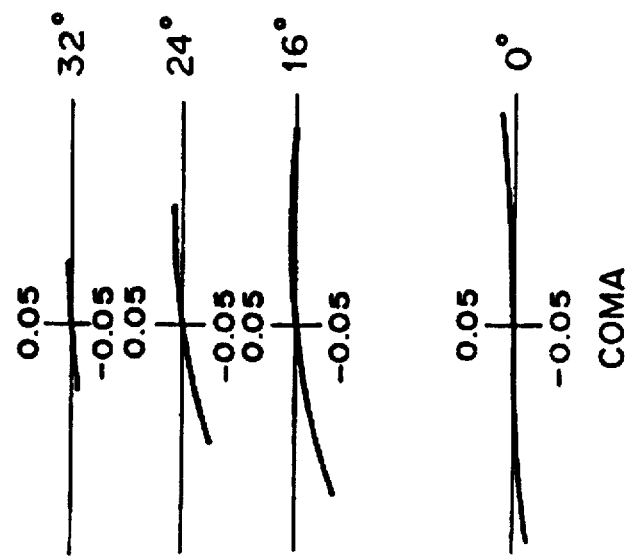
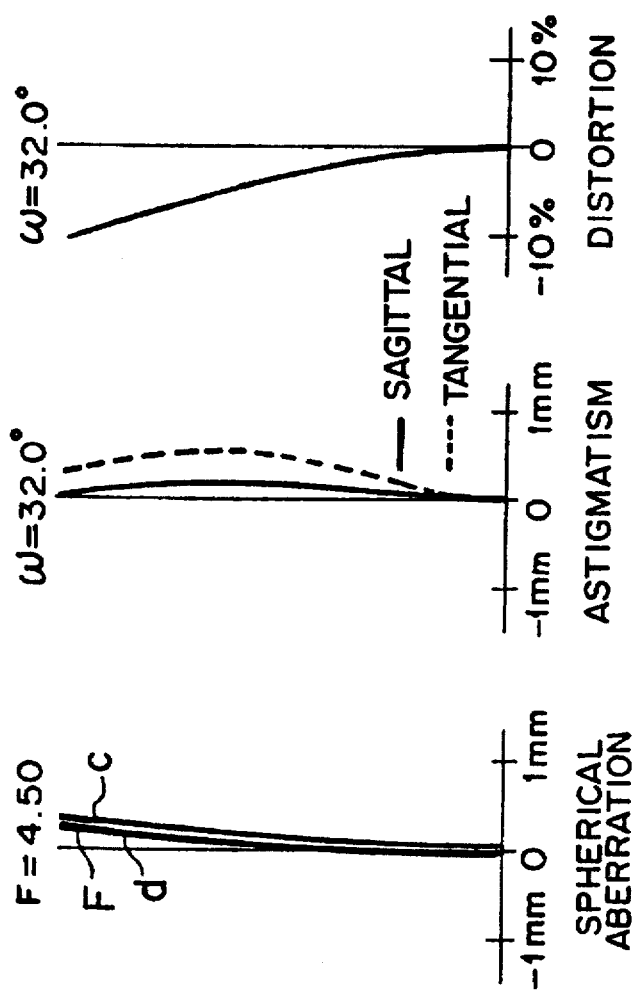
EMBODIMENT 2
SHORTEST FOCAL LENGTH STATE
FIG. 6A
FIG. 6B
FIG. 6C
FIG. 6D

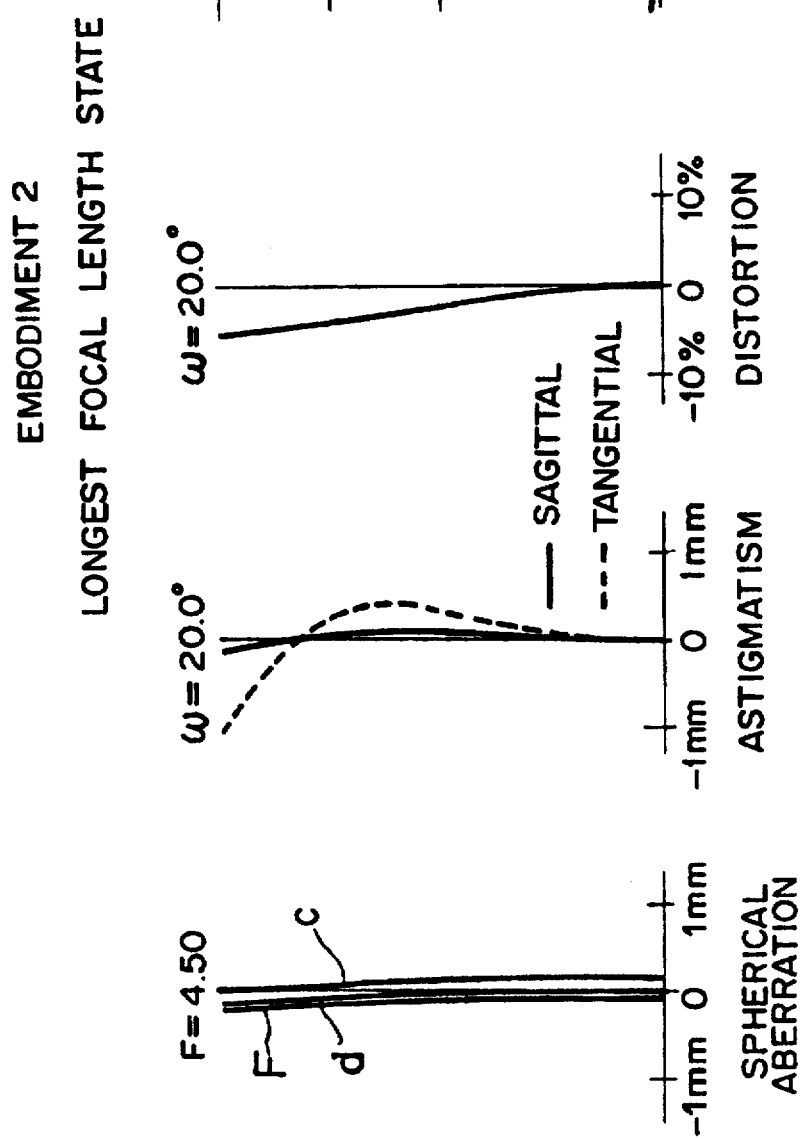

EYEPIECE ZOOM LENS SYSTEM

RELATED APPLICATIONS

This application claims the priority of Japanese Patent Application No. 7-260756 filed on Sep. 12, 1995, which is incorporated herein by reference.

BACKGROUND OF THE INVENTION

1. Field of the Invention

The present invention relates to an eyepiece zoom lens system used for telescopes, binoculars, and the like.

2. Description of the Prior Art

In general, in an eyepiece zoom lens system, a movable space for moving the lens system is necessary, whereby the total length of the lens system tends to become long. Accordingly, it is difficult to configure the zoom lens system in a compact size. Though the power of each lens group may be increased in order to attain a compact size, a larger amount of aberration will be generated thereby. Also, the amount of fluctuation in aberration due to zooming increases, thereby making it difficult to favorably correct the aberration while achieving a high zoom ratio. As examples of an eyepiece zoom lens system, those disclosed in Japanese Unexamined Patent Publication No. 53-51757 and Japanese Patent Publication No. 7-34061 have been known.

Though the lens systems disclosed in the above-mentioned publications have favorable performances, each of them has h zoom ratio of 2, which is not always sufficient in terms of the high zoom ratio. In recent years, there has been an attempt to increase the zoom ratio of compact cameras from double power zoom toward triple power zoom, while a demand for increasing the zoom ratio has also become higher in telescopes and binoculars.

SUMMARY OF THE INVENTION

In view of such circumstances, the object of the present invention is to provide an eyepiece zoom lens system which has a sufficient eye relief and can ameliorate various kinds of aberration, while attaining a zoom ratio as high as 3.

The eyepiece zoom lens system of the present invention comprises, successively from the eye point side, a first lens group $G_1$ having a positive refractive power, a second lens group $G_2$ having a positive refractive power, and a third lens group $G_3$ having a negative refractive power, wherein the first lens group $G_1$ is made stationary, whereas the second lens group $G_2$ and the third lens group $G_3$ are made as movable groups which, when changing the power, respectively move in directions opposite to each other on the optical axis while holding therebetween an object image which is formed between these two lens groups.

The first lens group $G_1$ comprises a laminated lens in which a biconcave lens and a biconvex lens which are successively disposed from the eye point side and bonded together; the second lens group $G_2$ comprises, successively from the eye point side, a laminated lens in which a biconvex lens and a negative meniscus lens whose concave surface faces the eye point are bonded together and a positive single lens; and the third lens group $G_3$ comprises one or two lenses including a negative lens.

Assuming that the shortest focal length of the whole lens system is $f_m$, the focal length of the first lens group $G_1$ is $f_1$, the focal length of the second lens group $G_2$ is $f_2$, the focal length of the third lens group $G_3$ is $f_3$, the principal point distance between the first lens group $G_1$ and the second lens group $G_2$ is $S_{12}$, the principal point distance between the second lens group $G_2$ and the third lens group $G_3$ is $S_{23}$, and the abbe numbers of the negative lenses in the first lens group $G_1$, second lens group $G_2$, and the third lens group $G_3$ are respectively $\nu_1$, $\nu_2$, and $\nu_3$, the following conditional expressions (1) to (8):

$$5 < f_1/f_m < 7 \tag{1}$$

$$3.5 < f_2/f_m < 4.5 \tag{2}$$

$$-3.7 < f_3/f_m < -3 \tag{3}$$

$$0.1 < S_{12}/f_m < 1.0 \tag{4}$$

$$6.0 < S_{23}/f_m < 8.0 \tag{5}$$

$$\nu_1 < 35 \tag{6}$$

$$\nu_2 < 35 \tag{7}$$

$$\nu_3 > 50 \tag{8}$$

are satisfied.

BRIEF DESCRIPTION OF THE DRAWINGS

FIG. 2 is a schematic view showing a basic lens configuration in accordance with Embodiment 2 of the present invention;

FIG. 3 is an aberration chart of the lens in accordance with Embodiment 1 (in its shortest focal length state);

FIG. 4 is an aberration chart of the lens in accordance with Embodiment 1 (in its middle state);

FIG. 5 is an aberration chart of the lens in accordance with Embodiment 1 (in its longest focal length state);

FIG. 6 is an aberration chart of the lens in accordance with Embodiment 2 (in its shortest focal length state);

FIG. 8 is an aberration chart of the lens in accordance with Embodiment 2 (in its longest focal length state).

DETAILED DESCRIPTION OF THE PREFERRED EMBODIMENTS

In the following, eyepiece zoom lens systems in accordance with embodiments of the present invention will be explained with reference to the drawings.

Embodiment 1

Figure 1:
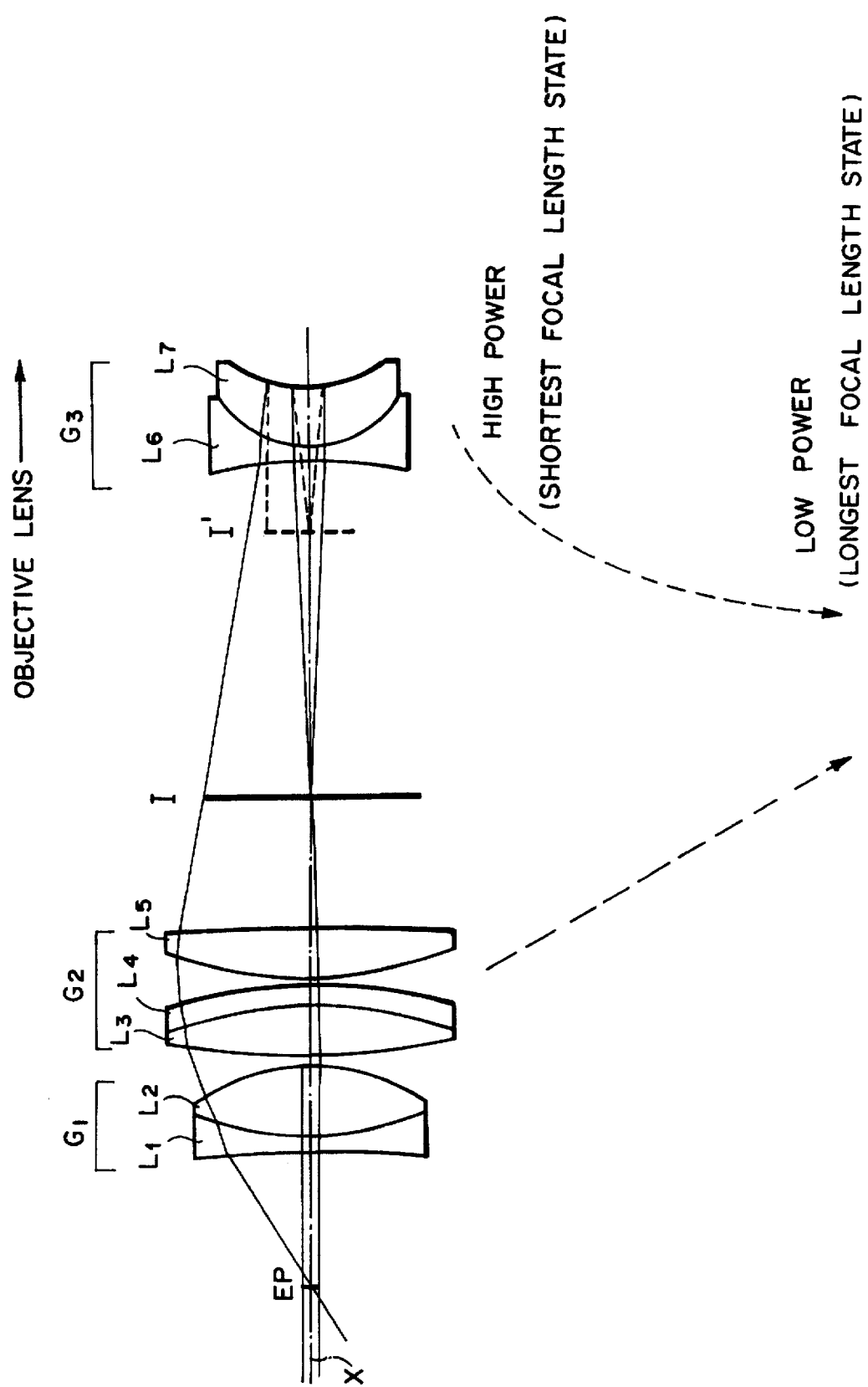
FIG. 1 is a schematic view showing a basic lens configuration in accordance with Embodiment 1 of the present invention.

FIG. 1 shows the basic lens configuration of Embodiment 1. As shown in FIG. 1, the eyepiece zoom lens system in accordance with this embodiment is disposed within the eyepiece section of a high-power monocular and constituted by seven sheets of lenses $L_1$ to $L_7$, namely, comprises, successively from the eye point side, a first lens group $G_1$, constituted by a biconcave first lens $L_1$ and a biconvex second lens $L_2$; a second lens group $G_2$ constituted by a biconvex third lens $L_3$, a fourth lens $L_4$ made of a negative meniscus lens whose concave surface faces the eye point, and a fifth lens $L_5$ whose surface with a larger curvature faces the eye point; and a third lens group $G_3$ constituted by a biconcave sixth lens $L_6$ and a positive meniscus lens whose convex surface faces the eye point. Also, the first lens $L_1$ and second lens $L_2$, the third lens $L_3$ and fourth lens $L_4$, and the sixth lens $L_6$ and seventh lens $L_7$ respectively constitute laminated lenses.

Also, the first lens group $G_1$ is made stationary, whereas the second lens group $G_2$ and the third lens group $G_3$ are made as movable groups which, when changing the power, respectively move in directions opposite to each other on the optical axis while holding therebetween an object image which is formed between these two lens groups.

Further, the configuration is made so as to satisfy the following conditions:

$$5 < f_1/f_m < 7 \quad (1)$$

$$3.5 < f_2/f_m < 4.5 \quad (2)$$

$$-3.7 < f_3/f_m < -3 \quad (3)$$

$$0.1 < S_{12}/f_m < 1.0 \quad (4)$$

$$6.0 < S_{23}/f_m < 8.0 \quad (5)$$

$$v_1 < 35 \quad (6)$$

$$v_2 < 35 \quad (7)$$

$$v_3 > 50 \quad (8)$$

In the following, the above conditional expressions (1) to (8) will be explained.

Beyond the upper limit of the above conditional expression (1), the refractive power of the first lens group $G_1$ becomes so weak that the amount of peripheral luminous flux refracted to the optical axis direction becomes small, whereby the power-changing effect of the second lens group $G_2$ decreases. Accordingly, the load on the third lens group $G_3$ for changing the power becomes too much, thereby deteriorating the balance in aberration correction and making it difficult to correct aberration. Below the lower limit, on the other hand, the refractive power of the first lens group $G_1$ becomes so strong that it becomes difficult to correct the aberration of the first lens group $G_1$.

Beyond the upper limit of the above conditional expression (2), the refractive power of the second lens group $G_2$ becomes so weak that the amount of movement of the second lens group $G_2$ for changing the power becomes too much. Below the lower limit, on the other hand, the refractive power of the second lens group $G_2$ becomes so strong that it becomes difficult to correct the aberration of the second lens group $G_2$.

Beyond the upper limit of the above conditional expression (3), the refractive power of the third lens group $G_3$ becomes so strong that it becomes difficult to correct the aberration of the third lens group $G_3$. In particular, aberration becomes worse when the focal length of the whole system as the eyepiece lens is long. Below the lower limit, on the other hand, the refractive power of the third lens group $G_3$ becomes so weak that it becomes difficult to correct the distortion in the third lens group $G_3$.

Beyond the upper limit of the above conditional expression (4), the distance between the first lens group $G_1$ and the second lens group $G_2$ becomes so large that the diameter of the second lens group $G_2$ increases, thereby making it difficult to correct aberration. Below the lower limit, by contract, the distance between the first lens group $G_1$ and the second lens group. $G_2$ becomes so small that the first lens group $G_1$ and the second lens group $G_2$ interfere with each other, thereby making it difficult to place the lenses.

Beyond the upper link of the above conditional expression (5), the distance between the second lens group $G_2$ and the third lens group $G_3$ increases such that the whole length of the lens system becomes too large, whereby a compact size cannot be attained. Below the lower limit, on the other hand, the distance between the second lens group $G_2$ and the third lens group $G_3$ becomes so small that the object image formed between the second lens group $G_2$ and the third lens group $G_3$ is positioned too close to the second lens group $G_2$ or the third lens group $G_3$, whereby dust which has adhered to the lens surface of the second lens group $G_2$ or third lens group $G_3$ becomes conspicuous.

The above conditional expression (6) is necessary for favorably correcting chromatic aberration without reducing the radius of curvature of the bonding surface of the positive lens constituting the first lens group $G_1$.

The above conditional expression (7) is necessary for favorably correcting chromatic aberration without reducing the radius of curvature of the bonding surface of the positive lens constituting the second lens group $G_2$.

The above conditional expression (8) is necessary for minimizing the fluctuation in chromatic aberration due to changes in the power.

In thus configured eyepiece zoom lens system, an object image I' which has been formed by a non-depicted objective lens is formed by the third lens group $G_3$ as a slightly enlarged image I between the third lens group $G_3$ and the second lens group $G_2$ and then guided to an eye point position E.P. by the second lens group $G_2$ and the first lens group $G_1$ so as to form an image again on the retina. Here, the object image formed by the objective lens without the third lens $G_3$ is indicated by I'.

Also, the image I of the object is moved when the third lens group $G_3$ is shifted, as indicated by a broken line in FIG. 1, between the shortest focal length state (high-power time as a telescope) and the longest focal length state (low-power time as a telescope). Further, when the second group $G_2$ is moved as indicated by a broken line in FIG. 1, the luminous flux of the image I of the object is guided onto the eye point E.P., thereby making it form an image on the retina.

Here, FIG. 1 shows the object image I' formed by the objective lens system alone.

Table 1 shows radius of curvature R (mm) of each lens surface, center thickness of each lens and air distance between neighboring lenses d (mm), and refractive index n and abbe number v of each lens at d line ($\lambda$=587.6 nm) in Embodiment 1.

In Table 1 and Table 3, which will be mentioned later, the numbers corresponding to the respective values of each of R, d, n, and v successively increase from the eye point E.P. side.

TABLE 1

| | R | d | n | v |
|---|---|---|---|---|
| 1 | −184.93 | 1.70 | 1.80518 | 25.4 |
| 2 | 31.22 | 7.11 | 1.58913 | 61.2 |
| 3 | −18.73 | $d_3$ (Variable) | | |
| 4 | 73.98 | 5.05 | 1.58913 | 61.2 |
| 5 | −38.00 | 2.00 | 1.80518 | 25.4 |
| 6 | −48.00 | 0.50 | | |
| 7 | 38.56 | 4.94 | 1.58913 | 61.2 |
| 8 | −263.19 | $d_s$ (Variable) | | |

TABLE 1-continued

| | R | d | n | v |
|---|---|---|---|---|
| 9 | −59.20 | 1.50 | 1.51680 | 64.2 |
| 10 | 10.42 | 6.01 | 1.80518 | 25.4 |
| 11 | 13.33 | B f (Variable) | | |

Also, Table 2 shows the values of $d_3$ (distance between the first lens group $G_1$ and the second lens group $G_2$), $d_8$ (distance between the second lens group $G_2$ and the third lens group $G_3$), and Bf (distance between the apex of the last surface of the lens system in the case where the ray tracing is performed from the eye point side and the virtual image (object image formed by the objective lens system alone) I' formed by the eyepiece lens system; back focus) in cases where f is 7.35 mm, 12.86 mm, and 22.05 mm, respectively.

TABLE 2

| f | $d_3$ | $d_8$ | B f |
|---|---|---|---|
| 7.35 | 1.05 | 45.75 | −14.24 |
| 12.86 | 17.46 | 25.61 | −10.51 |
| 22.05 | 28.84 | 9.05 | −5.33 |

Further, the values in Embodiment 1 are set as follows:
$f_1=45.71$, $f_2=28.28$, $f_3=-26.41$, $f_1/f_m=6.22$, $f_2/f_m=3.85$, $f_3/f_m=-3.59$, $S_{12}/f_m=0.36$, $S_{23}/f_m=7.59$, $v_1=25.4$, $v_2=25.4$, and $v_3=64.2$ thereby satisfying all the above conditional expressions (1) to (8).

Also, in the lens system of Embodiment 1, the values of the whole focal length f and field angle $2\omega$ are as follows:

focal length f=7.35 mm to 22.05 mm field angle $2\omega=64°$ to 40° whereby the zoom ratio is 3.

Embodiment 2

FIG. 2 shows the lens configuration of Embodiment 2. Its lens configuration and conditional expressions (1) to (8) are substantially the same as those of Embodiment 1 except that the fifth lens $L_5$ is a positive meniscus lens whose convex surface faces the eye point.

Table 3 shows radius of curvature R (mm) of each lens surface, center thickness of each lens and air distance between neighboring lenses d (mm), and refractive index n and abbe number v of each lens at d line in Embodiment 2.

TABLE 3

| | R | d | n | v |
|---|---|---|---|---|
| 1 | −233.21 | 1.70 | 1.80518 | 25.4 |
| 2 | 31.51 | 7.39 | 1.58913 | 61.2 |
| 3 | −19.18 | $d_3$ (Variable) | | |
| 4 | 52.28 | 5.88 | 1.58913 | 61.2 |
| 5 | −36.27 | 2.00 | 1.80518 | 25.4 |
| 6 | −40.14 | 0.50 | | |
| 7 | 44.94 | 3.70 | 1.58913 | 61.2 |
| 8 | 200.00 | $d_8$ (Variable) | | |
| 9 | −79.62 | 1.50 | 1.51680 | 64.2 |
| 10 | 10.07 | 5.80 | 1.80518 | 25.4 |
| 11 | 12.36 | B f (Variable) | | |

Also, Table 4 shows the values of $d_3$ (distance between the first lens group $G_1$ and the second lens group $G_2$), $d_8$ (distance between the second lens group $G_2$ and the third lens group $G_3$), and Bf (distance between the apex of the last surface of the lens system in the case where the ray tracing is performed from the eye point side and the virtual image (object image formed by the objective lens system alone) I' formed by the eyepiece lens system; back focus) in cases where f is 7.34 mm, 12.85 mm, and 22.02 mm, respectively.

TABLE 4

| f | $d_3$ | $d_8$ | B f |
|---|---|---|---|
| 7.34 | 1.08 | 45.61 | −13.84 |
| 12.85 | 17.63 | 25.43 | −10.20 |
| 22.02 | 29.21 | 8.83 | −5.19 |

Further, the values in Embodiment 2 are set as follows:
$f_1=45.55$, $f_2=29.02$, $f_3=-25.94$, $f_1/f_m=6.21$, $f_2/f_m=3.95$, $f_3/f_m=-3.53$, $S_{12}/f_m=0.31$, $S_{23}/f_m=7.64$, $v_1=25.4$, $v_2=25.4$, and $v_3=64.2$ thereby satisfying all the above conditional expressions (1) to (8).

Also, in the lens system of Embodiment 2, the values of the whole focal length f and field angle $2\omega$ are as follows:

focal length f=7.34 mm to 22.02 mm field angle $2\omega=64°$ to 40° whereby the zoom ratio is 3.

Figures 7A, 7B, 7C, 7D:
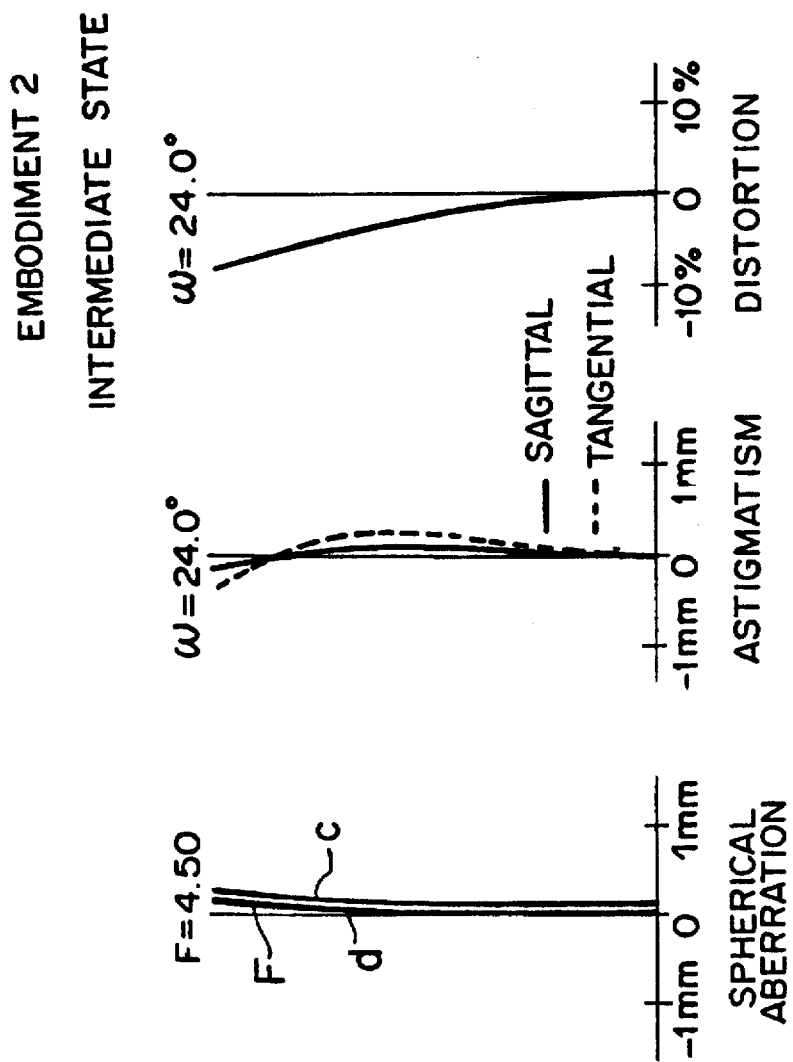
FIG. 7 is an aberration chart of the lens in accordance with Embodiment 2 (in its middle state)

FIGS. 3, 4, and 5 respectively show aberration charts (each showing spherical aberration, astigmatism, distortion, and coma) in Embodiment 1 in its shortest focal length state (high-power time as a telescope), intermediate state, and longest focal length state (low-power time as a telescope); whereas FIGS. 6, 7, and 8 respectively show aberration charts (each showing spherical aberration, astigmatism, distortion, and coma) in Embodiment 2 in its shortest focal length state (high-power time as a telescope), intermediate state, and longest focal length state (low-power time as a telescope).

As can be seen from FIGS. 3 to 8, in the above-mentioned embodiments, various kinds of aberration can be ameliorated, whereby performances which can be favorably used as an eyepiece zoom lens system can be attained.

Without being restricted to the above-mentioned embodiments, the zoom lens system of the present invention can be modified in various manners. For example, the radius of curvature r and the distance (or lens thickness) d can be appropriately modified.

As explained in the foregoing, in accordance with the eyepiece zoom lens system of the present invention, since it has a lens configuration comprising seven lenses in three groups and satisfies predetermined conditional expressions, a zoom ratio of 3 can be attained while having a sufficient eye relief and favorably correcting various kinds of aberration.

What is claimed is:

1. An eyepiece zoom lens system comprising, successively from an eye point side, a first lens group $G_1$ having a positive refractive power, a second lens group $G_2$ having a positive refractive power, and a third lens group $G_3$ having a negative refractive power, said first lens group $G_1$ being stationary, whereas said second lens group $G_2$ and said third lens group $G_3$ being movable groups which, when changing power, respectively move in directions opposite to each other on an optical axis while holding therebetween an object image which is formed between these two lens groups, wherein said first lens group $G_1$ comprises a laminated lens in which a biconcave lens and a biconvex lens which are successively disposed from the eye point side and bonded together; said second lens group $G_2$ comprises, successively from the eye point side, a laminated lens in which a biconvex lens and a negative meniscus lens whose concave surface faces the eye point are bonded together and a positive single lens; and said third lens group $G_3$ comprises one or two lenses including a negative lens and wherein, assuming that shortest focal length of the whole lens system is $f_m$, focal length of said first lens group $G_1$ is $f_1$, focal length of said second lens group $G_2$ is $f_2$, focal length of said third lens group $G_3$ is $f_3$, principal point distance between said first lens group $G_1$ and said second lens group $G_2$ is $S_{12}$, principal point distance between said second lens group $G_2$ and said third lens group $G_3$ is $S_{23}$, and abbe numbers of the negative lenses in said first lens group $G_1$, second lens group $G_2$, and third lens group $G_3$ are respectively $v_1$, $v_2$, and $v_3$, the following conditional expressions (1) to (8):

$$5 < f_1/f_m < 7 \tag{1}$$

$$3.5 < f_2/f_m < 4.5 \tag{2}$$

$$-3.7 < f_3/f_m < -3 \tag{3}$$

$$0.1 < S_{12}/f_m < 1.0 \tag{4}$$

$$6.0 < S_{23}/f_m < 8.0 \tag{5}$$

$$v_1 < 35 \tag{6}$$

$$v_2 < 35 \tag{7}$$

$$v_3 > 50 \tag{8}$$

are satisfied.

* * * * *